United States Patent
Namba et al.

(10) Patent No.: US 6,912,385 B2
(45) Date of Patent: Jun. 28, 2005

(54) ADAPTIVE COMMUNICATION SYSTEM, COMMUNICATION CONTROL DEVICE, COMMUNICATION TERMINAL, COMPUTER PROGRAM AND COMMUNICATION METHOD

(75) Inventors: Hideaki Namba, Obu (JP); Kazuoki Matsugatani, Kariya (JP); Mikio Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 569 days.

(21) Appl. No.: 09/955,272

(22) Filed: Sep. 12, 2001

(65) Prior Publication Data

US 2002/0032024 A1 Mar. 14, 2002

(30) Foreign Application Priority Data

Sep. 12, 2000  (JP) ........................................ 2002-278120

(51) Int. Cl.$^7$ ................................................ H04M 3/00
(52) U.S. Cl. ...................... 455/419; 455/418; 455/414.1
(58) Field of Search ................................ 455/419, 418, 455/414.1, 403; 340/539

(56) References Cited

U.S. PATENT DOCUMENTS

| 5,361,399 | A | * | 11/1994 | Linquist et al. .......... 455/412.2 |
| 5,655,003 | A | | 8/1997 | Erving et al. |
| 5,920,818 | A | | 7/1999 | Frodigh et al. |
| 6,115,750 | A | * | 9/2000 | Dillon et al. ................ 709/235 |
| 6,335,966 | B1 | * | 1/2002 | Toyoda ................... 379/100.06 |

FOREIGN PATENT DOCUMENTS

| EP | 0 781 064 | 6/1997 |
| EP | 0 858 237 | 8/1998 |
| EP | 0 951 189 | 10/1999 |

OTHER PUBLICATIONS

European Search Report dated Apr. 14, 2003, in corresponding EP Application No. 01 122 005.0.

* cited by examiner

Primary Examiner—Melur Ramakrishnaiah
(74) Attorney, Agent, or Firm—Harness, Dickey & Pierce, PLC (57) ABSTRACT

First, in a microcomputer of a communication terminal, data communication request is carried out. Next, a profile corresponding to contents of requested data is received from a communication control device. The microcomputer then selects one of communication systems based on the profile. The result of the selection is notified to the communication control device. Then, a transmission request signal is transmitted from the microcomputer. Thereafter, the data is received from the communication control device through the selected communication system. Thus, the download through the selected communication system is completed.

30 Claims, 8 Drawing Sheets

| TRANSMISSION RATE | SCORE |
|---|---|
| 9600bps | 10 |
| 14400bps | 10 |
| 32000bps | 50 |
| 64000bps | 50 |
| 128000bps | 50 |
| 384000bps | 100 |
| 640000bps | 100 |
| 2400000bps | 100 |

FIG. 5B

| MOVING SPEED | 10km OR LESS | — | 50km | 60km | — | 100km | 100km OR OVER |
|---|---|---|---|---|---|---|---|
| SCORE | 100 | 50 | 50 | 30 | 30 | 10 | 10 |

ADAPTIVE COMMUNICATION SYSTEM, COMMUNICATION CONTROL DEVICE, COMMUNICATION TERMINAL, COMPUTER PROGRAM AND COMMUNICATION METHOD

CROSS REFERENCE TO RELATED APPLICATION

This application is based on and incorporates herein by reference Japanese Patent Application No. 2000-278120 filed on Sep. 13, 2000.

BACKGROUND OF THE INVENTION

1. Field of the Invention

The present invention relates to an adaptive communication system.

2. Description of Related Art

The present invention relates to an adaptive communication system.

Various dual-band radio communication terminals have been proposed. One such communication terminal (disclosed in Japanese Unexamined Patent Publication No. 11-298964) is adapted for use with two communication systems, namely, the PHS system and the PDC system. Another such communication terminal is adapted for use with another two communication systems, namely, the CDMA system and the AMPS (Advanced Mobile Phone Service). In both cases, the communication terminal selects one of the two communication systems which provides a higher received power than the other.

However, in the above dual-band radio communication terminal, the communication system is selected based on the received power when the communication terminal downloads contents data, as described above. Thus, depending on the contents data to be downloaded, appropriate selection of the communication system cannot be made.

For example, in a case of downloading contents data of a newspaper, the contents data is relatively large. Thus, in this case, a large-volume, high-speed communication system (e.g., the PHS system) is required. However, depending on the received power at the dual-band communication terminal, the above dual-band radio communication terminal could select a low-volume, low-speed communication system (e.g., the PDC system). In this case, a degree of emergency for downloading the data (necessity of quick response) is relatively low. Thus, it is preferred that the communication terminal holds the download until the communication terminal enters an operation area of the large-volume, high-speed communication system instead of immediately initiating the download of the data through the low-volume, low speed communication system.

SUMMARY OF THE INVENTION

The present invention addresses the above disadvantage. Thus, it is an objective of the present invention to provide an adaptive communication system that can conduct an appropriate communication based on contents of data to be transmitted. It is another objective of the present invention to provide a communication control device used in the adaptive communication system. It is a further objective of the present invention to provide a communication terminal used in the adaptive communication system. It is a further objective of the present invention to provide a computer program for operating a computer of the communication terminal. It is a further objective of the present invention to provide a communication method for the adaptive communication system.

To achieve the objectives of the present invention, there is provided an adaptive communication system including a first communication device and a second communication device. The first communication device is adapted for use with a plurality of communication systems. The first communication device transmits a first request signal for requesting download of data to the second communication device. The second communication device transmits data attribute information indicative of contents of the data to the first communication device after reception of the first request signal. The first communication device selects one of the plurality of communication systems based on the data attribute information after reception of the data attribute information. The first communication device transmits a second request signal for requesting the download through the selected communication system to the second communication device. The second communication device transmits the data to the first communication device through the selected communication system after reception of the second request signal. The first communication device receives the data.

The first communication device may select the one of the plurality of communication systems also based on system attribute information of each one of the plurality of communication systems besides the data attribute information.

To achieve the objectives of the present invention, there is provided an adaptive communication system including a first communication device and a second communication device. The first communication device is adapted for use with a plurality of communication systems and uploads data to the second communication device. The first communication device selects one of the plurality of communication systems based on data attribute information indicative of contents of the data. The first communication device transmits the data to the second communication device through the selected communication system.

To achieve the objectives of the present invention, there is also provided a communication control device including a data storage, an attribute adder, a first receiver, a data attribute information transmitter, a second receiver and a data transmitter. The data storage stores data. The attribute adder adds data attribute information indicative of contents of the data. The first receiver receives a first request signal for requesting download of the data. The data attribute information transmitter transmits the data attribute information in response to reception of the first request signal. The second receiver receives a second request signal for requesting the download. The second request signal is made based on the data attribute information. The data transmitter transmits the data in response to reception of the second request signal.

To achieves the objectives of the present invention, there is also provided a communication terminal including a control unit and being adapted for use with a plurality of communication systems. The communication terminal includes a first transmitting means, a first receiving means, a selecting means, a second transmitting means and a second receiving means. The first transmitting means transmits a first request signal to a second communication device in response to operation of the control unit. The first request signal requests download of data. The first receiving means receives data attribute information indicative of contents of the data from the second communication device after transmission of the first request signal. The selecting means selects one of the plurality of communication systems based on the data attribute information after reception of the data attribute information. The second transmitting means transmits a second request signal to the second communication device. The second request signal requests the download through the selected communication system. The second receiving means receives the data from the second communication device through the selected communication system after transmission of the second request signal.

To achieve the objectives of the present invention, there is also provided a computer program for operating a computer of a communication terminal. The computer program executes steps of transmitting a first request signal to a second communication device in response to operation of a control unit of the communication terminal, the first request signal requesting download of data, receiving data attribute information indicative of contents of the data from the second communication device after transmission of the first request signal, selecting one of the plurality of communication systems based on the data attribute information after reception of the data attribute information, transmitting a second request signal to the second communication device, the second request signal requesting the download through the selected communication system and receiving the data from the second communication device through the selected communication system after transmission of the second request signal.

To achieve the objectives of the present invention, there is also provided a communication method including steps of transmitting a first request signal from a first communication device to a second communication device, the first request signal requesting download of data, transmitting data attribute information from the second communication device to the first communication device after reception of the first request signal, the data attribute information being indicative of download time determined based on contents of the data, transmitting a second request signal from the first communication device to the second communication device at the download time after reception of the data attribute information, the second request signal requesting the download, transmitting the data from the second communication device to the first communication device after reception of the second request signal, and receiving the data in the first communication device.

To achieve the objectives of the present invention, there is also provided a communication control device including a data storage, an attribute adder, a first receiver, a data attribute information transmitter, a second receiver and a data transmitter. The data storage stores data. The attribute adder adds data attribute information indicative of download time determined based on contents of the data. The first receiver receives a first request signal for requesting download of the data. The data attribute information transmitter transmits the data attribute information in response to reception of the first request signal. The second receiver receives a second request signal for requesting the download. The data transmitter transmits the data in response to reception of the second request signal.

To achieve the objectives of the present invention, there is also provided a communication terminal including a control unit. The communication terminal further includes a first transmitting means, a first receiving means, a second transmitting means and a second receiving means. The first transmitting means transmits a first request signal to a second communication device in response to operation of the control unit. The first request signal requests download of data. The first receiving means receives data attribute information from the second communication device after transmission of the first request signal. The data attribute information is indicative of download time determined based on contents of the data. The second transmitting means transmits a second request signal to the second communication device at the download time after reception of the data attribute information. The second request signal requests the download. The second receiving means receives the data from the second communication device after transmission of the second request signal.

To achieve the objectives of the present invention, there is also provided a computer program for operating a computer of a communication terminal. The computer program executes steps of transmitting a first request signal to a second communication device in response to operation of a control unit of the communication terminal, the first request signal requesting download of data, receiving data attribute information from the second communication device after transmission of the first request signal, the data attribute information being indicative of download time determined based on contents of the data, transmitting a second request signal to the second communication device at the download time after reception of the data attribute information, the second request signal requesting the download, and receiving the data from the second communication device after transmission of the second request signal.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An adaptive communication system according to one embodiment of the present invention will be described with reference to the accompanying drawings.

Figure 1:
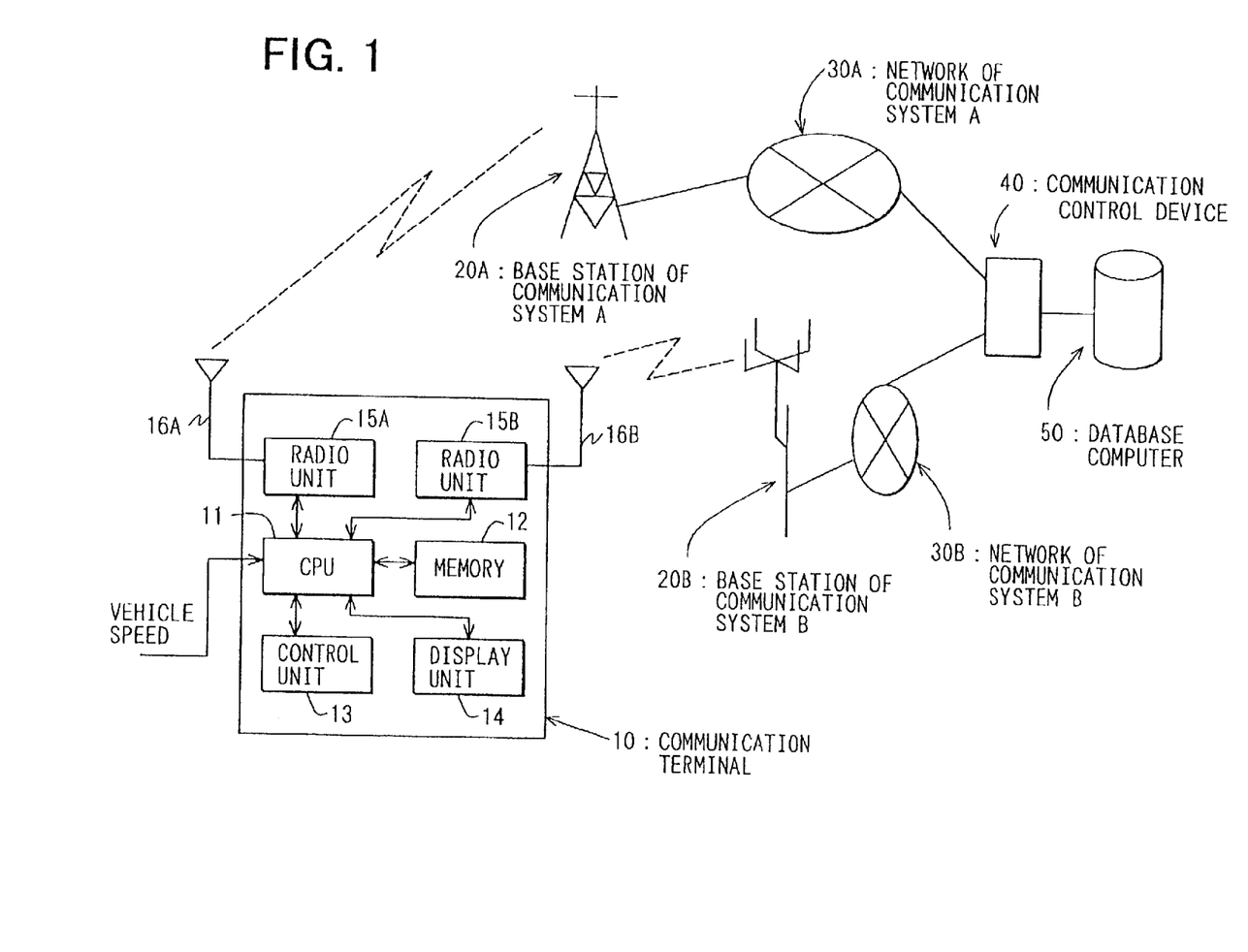
FIG. 1 is a schematic diagram showing an adaptive communication system according to one embodiment of the present invention.

As shown in FIG. 1, the adaptive communication system includes a communication terminal 10, base stations 20A, 20B, networks 30A, 30B, a communication control device 40 and a database computer 50. The communication terminal 10 (radio communication terminal) is a dual-mode cellular phone (dual-band radio communication terminal) that is adapted for use with both the communication system A and the communication system B. In this embodiment, it is assumed that the communication terminal 10 is installed in a vehicle.

The communication terminal 10 includes a microcomputer (CPU) 11, a memory 12, a control unit 13, a display unit 14, radio units 15A, 15B and antennae 16A, 16B. The microcomputer 11 executes various processes, such as a telephone call process, a download process and an upload process. A vehicle speed signal from a vehicle speed sensor of the vehicle is inputted to the microcomputer 11. The memory 12 stores computer programs for executing the telephone call process, the download process, the upload process and the like. Furthermore, the memory 12 stores score values to be used in an evaluation function which will be described below in greater detail. The display unit 14 is, for example, a liquid crystal panel and is controlled by the microcomputer 11 to display various information.

The radio unit 15A is controlled by the microcomputer 11 to transmit and receive signals through the antenna 16A. The radio unit 15B is controlled by the microcomputer 11 to transmit and receive signals through the antenna 16B. The control unit 13 includes a plurality of keys, such as ten keys, an enter key, a selection key and the like.

The base station 20A constitutes a communication system A in cooperation with the network 30A. The base station 20B constitutes a communication system B in cooperation with the network 30B. Each communication system A, B is connected to the communication control device 40 through a public network (communication system network). The communication system A uses the PDC system (or the CDMAone system or W-CDMA system). The communication system B uses the PHS system (or the DSRC system or wireless LAN system).

A communication rate (transmission rate: 9600 bps) of the communication system A is lower than a communication rate (transmission rate: 64000 bps) of the communication system B. In the present embodiment, the communication rate is used as system attribute information. In this embodiment, the system attribute information is the attribute information of the corresponding communication system. Furthermore, a maximum communicatable moving speed of the communication terminal of the communication system A is higher than a maximum communicatable moving speed of a communication system B (a communication cost of the communication system A is higher than a communication cost of the communication system B).

Figures 2, 3:
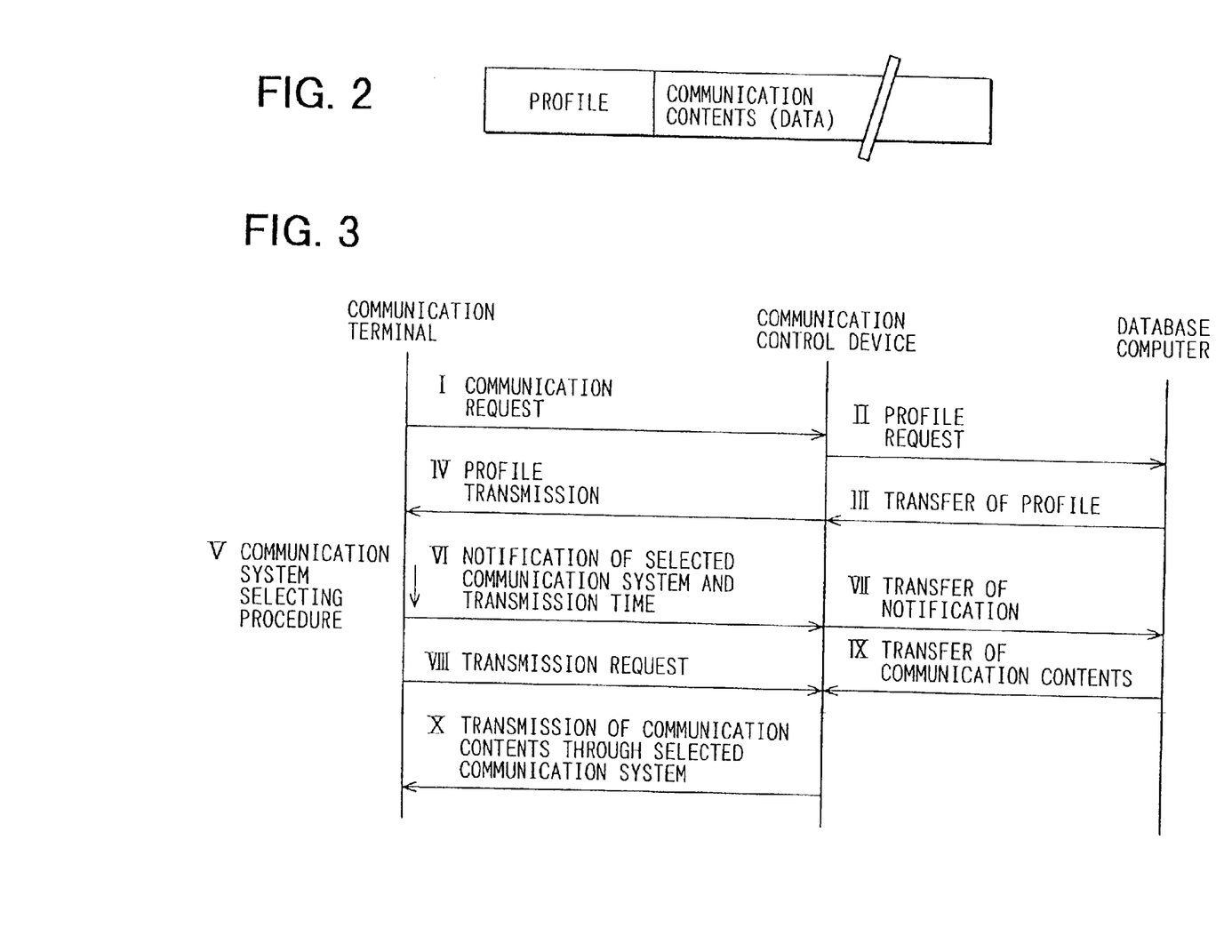
FIG. 2 is a diagram showing a profile and data stored in a database computer shown in FIG. 1.
FIG. 3 is a diagram showing operation of the adaptive communication system.

The communication control device 40 receives a profile (data attribute information), which will be described later, from the database computer 50 and transmits it to the communication terminal 10. The database computer 50 is a "server" and stores various data (various contents data) and profiles of such data in its memory (data storage). As shown in FIG. 2, each profile is added to a head of the corresponding data (communication contents). The profile is added to the memory of the database computer 50 through an input operation (attribute adder). The profile is data attribute information corresponding to the contents of the data. Examples of the data attribute information include a secrecy level of the data, a type of the evaluation function, a type of the communication system, a place of the communication, download time and the like.

The evaluation function is the function used for determining one of the communication systems A, B that corresponds to or suitable for the contents of the data. Here, the communication system is the system (e.g., the PDC system, the CDMA system, the W-CDMA system, the PHS system, the LAN system or the like) that corresponds to the contents of the data. The place of the communication is the place where the data can be received by the communication terminal 10 and which is determined based on the contents of the data. The download time is the time at which the data can be downloaded by the communication terminal 10 and which is determined based on the contents of the data.

Figure 4:
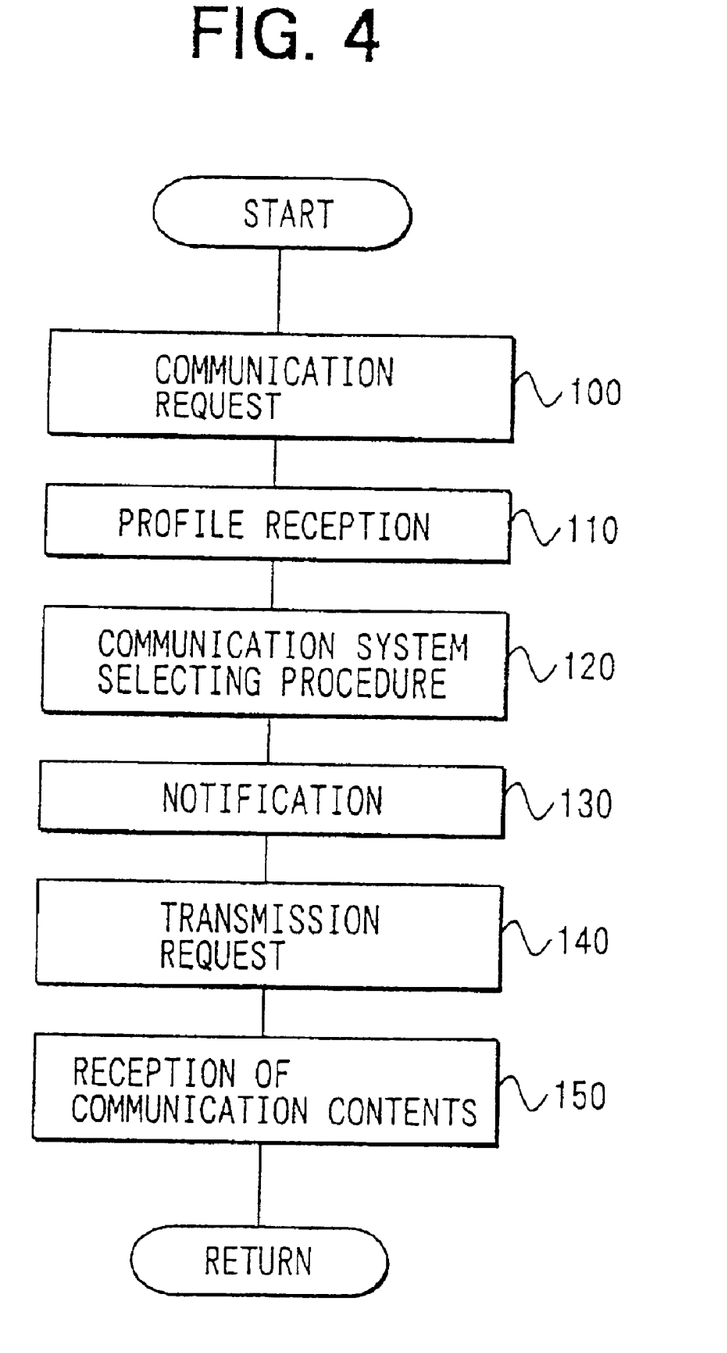
FIG. 4 is a flow chart showing operation of a communication terminal shown in FIG. 1.

Operation of the adaptive communication system of the present embodiment will be described with reference to FIGS. 3 and 4. FIG. 3 is a diagram showing the operation of the adaptive communication system, and FIG. 4 is a flow chart showing operation of the microcomputer 11 of the communication terminal 10. The microcomputer 11 executes the operation by following the flow chart shown in FIG. 4. First, the operation of the entire communication system will be described with reference to FIG. 3. As an example operation of the adaptive communication system, download of newspaper data by the communication terminal 10 will be described. Here, it is assumed that the data of the newspaper is relatively large, and the contents of the newspaper show a relatively low degree of download urgency.

First, it is assumed that the microcomputer 11 of the communication terminal 10 has compared a received power of the radio unit 15A and a received power of the radio unit 15B with each other upon a corresponding key operation of the control unit 13, and the communication terminal 10 is now connected to the network A through the communication system A based on the result of the comparison. At this state, if a user operates the control unit 13 to request the download of the data, a communication request signal (first request signal) is transmitted through the radio unit 15A (I in FIG. 3). The transmitted communication request signal is received by the communication control device 40 through the base station 20A and the network A.

When the communication control device 40 (a first receiver) receives the communication request signal, the communication control device 40 requests transmission of a profile indicative of the attribute of the requested data to the database computer 50 (II in FIG. 3). Then, the database computer 50 transmits the requested profile to the communication control device 40 (III in FIG. 3). Thereafter, the communication control device 40 transmits the profile to the communication terminal 10 (a second receiver: IV in FIG. 3) through the network A and the base station 20A.

Upon reception of the profile, the communication terminal 10 carries out a selecting/determining process for determining the communication system to be used for the download of the data based on the profile (V in FIG. 3). That is, in the selecting/determining process, one of the communication systems A, B is selected based on the contents of the data (newspaper data) For example, it is now assumed that the communication system B is selected. Hereinafter, the communication system selected in this manner is referred to as the selected communication system. Details of the selecting/determining process will be described later.

Next, the communication terminal 10 transmits a notification signal indicative of the selected communication system to the communication control device 40 through the base station 20B and the network B (VI in FIG. 3) The communication control device 40 transmits the notification signal to the database computer 50 (VII in FIG. 3). When the database computer 50 receives the notification signal, the database computer 50 transmits the data (newspaper data) to the communication control device 40 (IX in FIG. 3). The communication control device 40 stores the data (newspaper data) therein.

When the communication system B is selected as the selected communication system, the microcomputer 11 of the communication terminal 10 transmits a transmission request signal (second request signal) to the base station 20B through the radio unit 15B. The base station 20B transmits the transmission request signal to the communication control device 40 through the network B (VIII in FIG. 3). When the communication control device 40 receives the transmission request signal, the communication control device 40 (data transmitter) transmits the data (newspaper data) to the communication terminal 10 through the network B and the base station 20B (X in FIG. 3). Then, the communication terminal 10 receives the data and stores the data in the memory 12. Thereby, the download of the data (newspaper data) ends.

The operation of the microcomputer 11 of the communication terminal 10 will be described with reference to FIG. 4. First, at step 100, data communication request is carried out. Next, at step 110, the profile corresponding to the contents of the data is received from the communication control device 40. At the subsequent step 120, one of the communication systems is selected based on the profile. At the following step 130, the result of the selection is notified to the communication control device 40. Then, at step 140, the transmission request signal is transmitted through the radio unit 15B. Thereafter, at step 150, the data (newspaper data) is received through the radio unit 15B.

Before the transmission of the transmission request signal, the microcomputer 11 notifies the selected communication system to the user through the display unit 14. For example, if the communication system B is selected, the microcomputer 11 controls the display unit 14 to display a message, for example, informing that "the communication system B is selected, and do you request download of the data ? 1: YES, 2: NO". Then, when the ten key "1" of the control unit 13 is pressed, the download of the data proceeds. On the other hand, when the ten key "2" of the control unit 13 is pressed, control moves to step 120.

In this manner, it is possible to terminate the download through the selected communication system according to the will of the user. The microcomputer 11 does not necessarily transmit the transmission request signal immediately upon operation of the control unit 13. That is, the data indicative of the download time can be included in the profile transmitted to the communication terminal 10 in addition to the evaluation function, so that the transmission request signal can be transmitted from the microcomputer 11 of the communication terminal 10 at the download time specified in the profile later on.

Figure 5A:
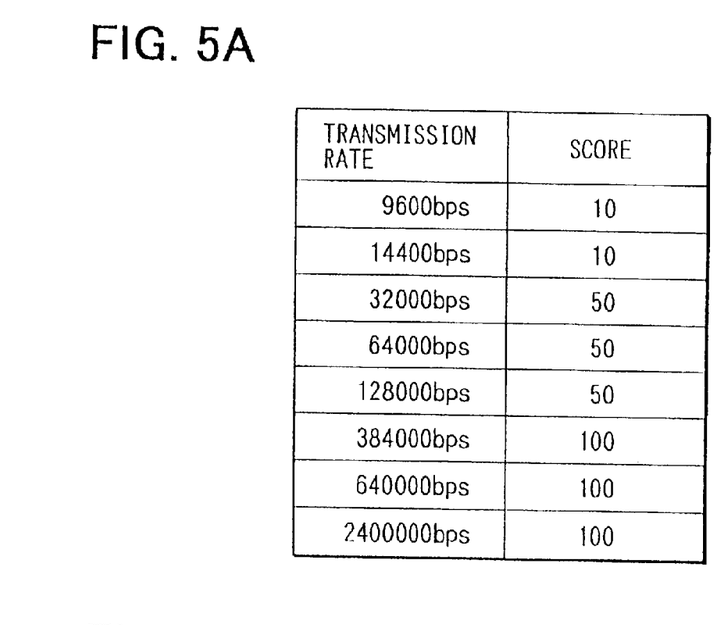
FIG. 5A is a diagram showing transmission rates of the communication terminal.
Figure 5B:
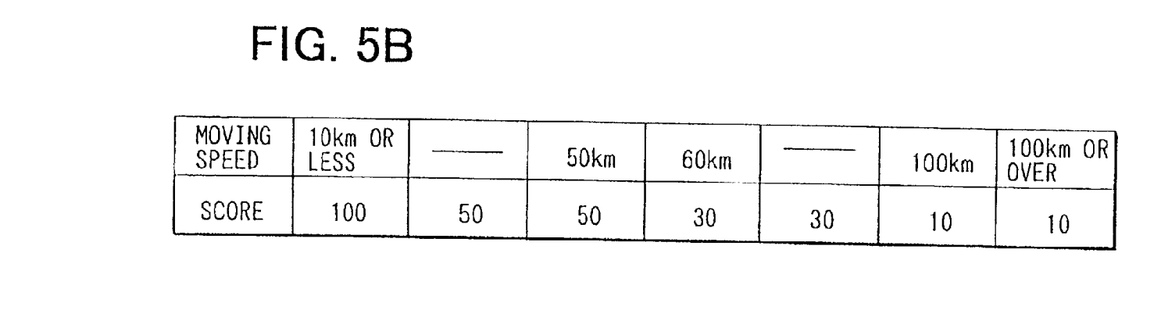
FIG. 5B is a diagram showing moving speeds of the communication terminal.

Details of the selecting/determining process carried out by the microcomputer 11 of the communication terminal 10 will be described with reference to FIGS. 5A and 5B. FIG. 5A is a diagram showing a table containing score values for the various transmission rates of the communication systems. The table is used to convert the transmission rates to the corresponding score values. FIG. 5B is a diagram showing a table containing score values for the various moving speeds of the communication terminal 10. The table is used to convert the moving speeds to the corresponding score values. In this instance, the profile transmitted to the communication terminal 10 based on the contents of the data includes the following evaluation function.

First, the following formula 1 is used as the evaluation function for selecting the communication system that corresponds to the contents of the data.

$$J = W1 \times (\text{transmission rate}) + W2 \times (\text{moving speed}) \quad [\text{FORMULA 1}]$$

The transmission rate of the formula 1 is the score value of the transmission rate of the currently used communication system shown in FIG. 5A. The moving speed of the formula 1 is the score value of the moving speed of the communication terminal 10 (the output of the vehicle speed sensor in this embodiment) shown in FIG. 5B. W1 and W2 are weighing coefficients. Each one of W1 and W2 is "1" in this instance and is determined based on the contents of the data. That is, in this embodiment, each value of W1 and W2 is determined based on the fact that the data is relatively large, and the contents of the data (newspaper data) shows the relatively low degree of download urgency. In a case of image data, sound data or data showing relatively high download urgency, W1 and W2 may be a value different from "1", and a formula different from the formula 1 may be used as the evaluation function.

In the present embodiment, if an evaluation value J is greater than 100 (threshold value), i.e., J>100, the communication system B is selected. On the other hand, if the evaluation value J is equal to or less than 100 (threshold value), i.e., J≦100, the communication system A is selected.

As a specific example, it is assumed that the moving speed is less than 10 km, and the communication system A is currently selected. In this instance, the transmission rate of the communication system A is 9600 bps, so that "10" is selected as the score value for that transmission rate based on the diagram shown in FIG. 5A. Since the moving speed is less than 10 km, "100" is selected as the score value for that moving speed based on the diagram shown in FIG. 5B. When these scores are selected for both the moving speed and the transmission rate, respectively, the evaluation value J is "110" that is greater than 100, so that the communication system B is selected. That is, the communication system is switched from the communication system A to the communication system B.

Furthermore, if the communication system A is currently selected, and the moving speed is equal to or greater than 100 km, "10" is selected as the score value for the moving speed. Since the score value of the moving speed is "10", the evaluation value J is "20" that is less than 100, so that the communication system A is selected.

Characteristics of the present embodiment will be described. In the case of downloading the large data (contents data), such as the newspaper data, the communication system that allows the large-volume, high-speed communication is required, but the degree of download urgency for downloading the data is relatively low. The communication system B shows the higher communication rate in comparison to the communication system A, and the communication system B shows the lower maximum communicatable moving speed of the communication terminal in comparison to the communication system A. Because of the above fact, the communication system B is suitable for the download of the large data, such as the newspaper data.

As a result, in the present embodiment, when the moving speed of the communication terminal 10 is relatively low (e.g., less than 10 km), the communication system B is selected through the evaluation function of the formula 1 in the process of selecting the communication system. For example, while the vehicle that has the communication terminal 10 stops at the red light traffic signal, the communication system B is selected, and the data is downloaded through the communication system B. Thus, the appropriate communication corresponding to the contents of the data is possible.

Furthermore, when the moving speed of the communication terminal 10 is relatively high (e.g., 100 km or higher), the communication system A is selected. However, it is possible to prevent the download of the data by operating the control unit 13. As described above, the communication control device 40 can store the data, and the communication control device 40 can also transmit and receive the profile. Thus, it is possible to reduce workload of the database computer 50.

(Modifications)

In the above embodiment, one exemplary adaptive communication system is described in which the communication terminal 10 selects one of the communication systems (communication system A or B) based on the profile (data attribute information). However, it is possible to modify the adaptive communication system in such a manner that the communication control device 40 selects the communication system as will be described below. A structure of such an adaptive communication system will be described with reference to FIG. 6. The adaptive communication system shown in FIG. 6 includes a communication terminal 10, base stations 21–24, a communication control device 40, a provider 400 and sites 300–302.

Figure 6:
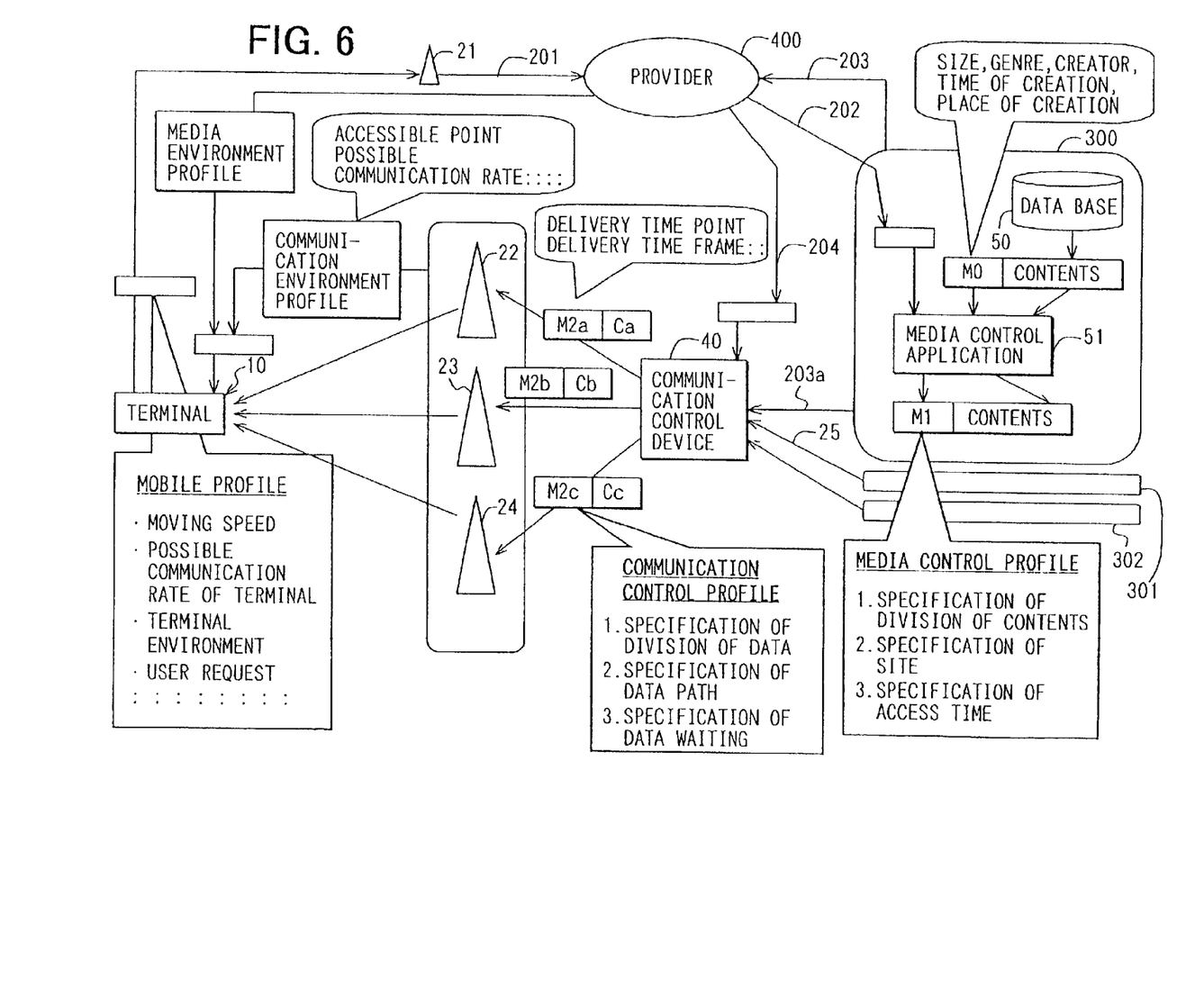
FIG. 6 is a schematic diagram showing a modification of the embodiment.

First, the communication terminal 10 transmits a request signal to the provider 400 through the base station 21 (an arrow 201 in FIG. 6). The request signal includes a mobile profile (various information including a moving speed, a possible communication rate, terminal environment, user environment and the like). Based on the request signal, the provider 400 accesses the site 300 (202 in FIG. 6) and the communication control device 40 (204 in FIG. 6).

Next, in the site 300, if the site 300 has the contents which are requested from the user through the request signal, the site 300 replies to inform it (arrow 203 in FIG. 6). In a media control application, the contents and a profile M0 (a data size, a creator, time of creation, a place of creation) are inputted from the database computer 50, and a data format of the contents is converted. Then, the profile M0 is also converted to a profile M1 (specification of division of the contents, specification of the site, specification of the access time). Thereafter, the profile M1 is transmitted to the communication control device 40 along with the converted contents data.

Next, in the communication control device 40, based on the access from the provider 400 and the profile M1, the contents data is divided into three contents data segments Ca, Cb, Cc, and profiles M2a, M2b, M2c are added for these contents data segments Ca, Cb, Cc, respectively. Each one of the profiles M2a–M2c contains various information including the specification of division of the data, the specification of data path (specification of the communication system), data wait time, delivery time and the like. Based on the profile M1, the communication control device 40 transmits the contents data segments Ca, Cb, Cc together with the corresponding profiles M2a, M2b, M2c to the different corresponding base stations 22–24, respectively. Each base station 22–24 transmits the corresponding contents data segment Ca, Cb, Cc together with the corresponding profile M2a, M2b, M2c to the communication terminal 10.

That is, the communication control device 40 transmits the contents data segments Ca, Cb, Cc together with the corresponding profiles M2a, M2b, M2c to the communication terminal 10 through the different communication systems. Thereafter, the communication terminal 10 integrates the contents data segments Ca, Cb, Cc based on the corresponding profiles M2a, M2b, M2c.

Figure 7:
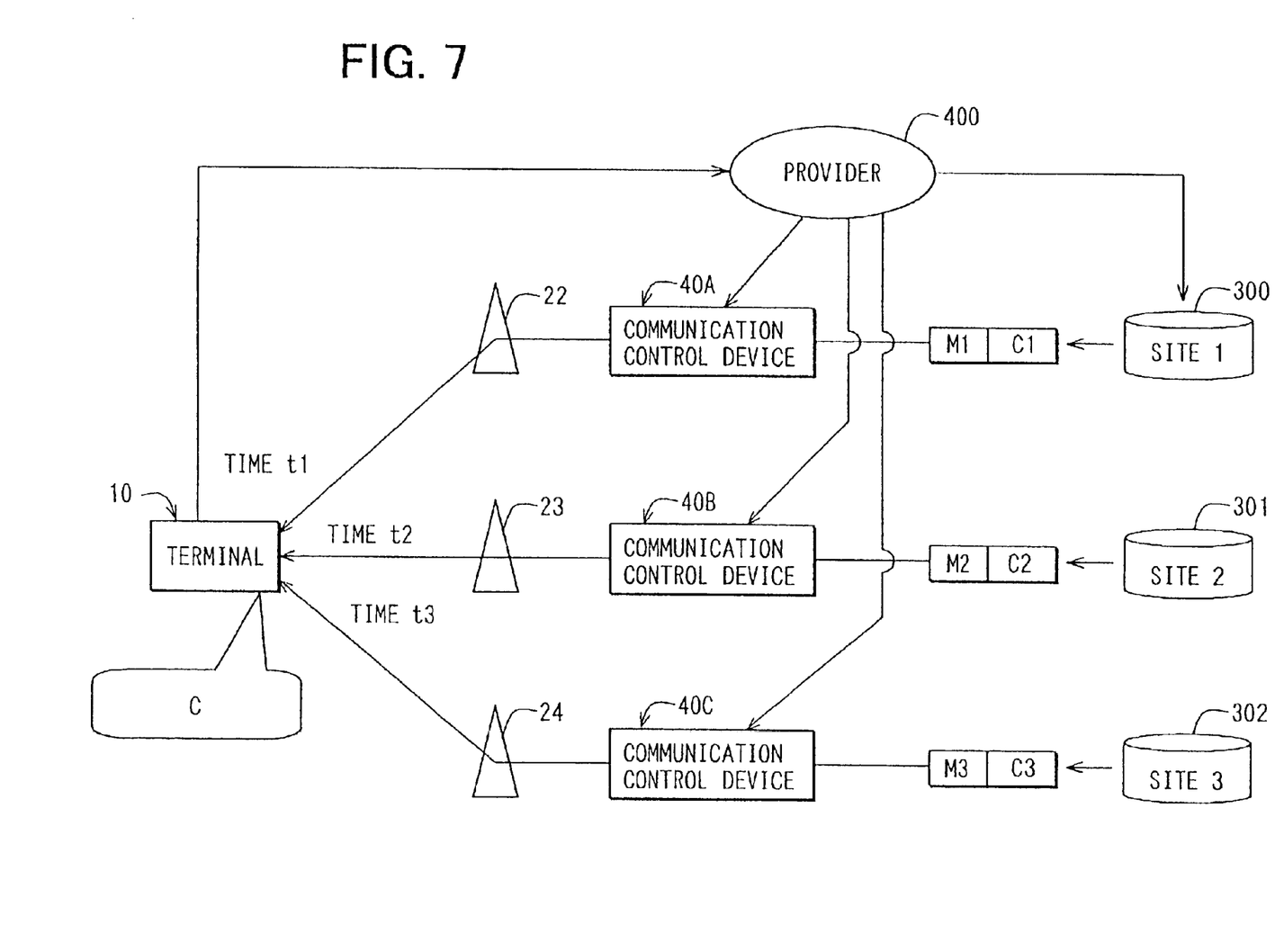
FIG. 7 is a schematic diagram showing a modification of the embodiment.

The adaptive communication system is not limited to the above modification and can be modified to the one shown in FIG. 7. In this case, a contents data segment C1 and a profile M1 are transmitted to a communication control device 40A from the site 300, and a contents data segment C2 and a profile M2 are transmitted to a communication control device 40B from a site 301. Furthermore, a contents data segment C3 and a profile M3 are transmitted to the communication control device 40c from a site 302. Each one of the profiles M1–M3 includes delivery time (t1, t2, t3) of the corresponding contents data segment C1–C3 and an integration method thereof. Each one of the communication control device 40A–40C transmits the corresponding contents data segment C1–C3 through the corresponding base station 22–24 to the communication terminal 10 at the time specified in the corresponding profile M1–M3. Then, the communication terminal 10 integrates the contents data segments C1–C3 based on the corresponding profiles M1–M3 (integration method).

In the above embodiment, the communication rate is used as the exemplary system attribute information, and one of the communication systems A, B is selected based on the data attribute information. However, this arrangement can be modified as follows. That is, besides the communication rate, the system attribute information can be a place of transmission, a communication type (two-way communication, packet communication, transceiver communication), a communication data format, an encryption means, a communication protocol, a multiplexing method, a media searching method, a media filtering method, a media description method, media encoding method or the like. In this embodiment, the communication data format is the data format used in the communication of the profile (data attribute information), the data contents, the system attribute information and the like. The media filtering method is the method for extracting only the necessary contents from various contents of the media to be delivered based on the requested attribute information. The media processing method can be one of various processing methods, for example, for compression, decompression, encoding, decoding, modulation, transmission, replay, display, conversion or recognition/interpretation of various data, such as video data, sound data, graphic data. The media description method is the method for writing a structure, semantics and the like of contents of the media. One representative example of the media description method is the MPEG7 standard. The media encoding method is the method for compressing and encoding video data, sound data and/or the like based on a communication band, a storage size and/or the like. In a case of a still picture, the JPEG is often used, and in a case of a motion picture, the MPEG is often used.

For example, if the place of transmission is selected as the system attribute information, one of the places where the communication terminal 10 can transmit and receive the data is selected based on the data attribute information. That is, the communication terminal 10 can receive the data at the selected place of transmission that is selected based on the data attribute information. If one of the communication type, the communication protocol, the encryption method, the communication data format, the multiplexing method, the media searching method, the media filtering method, the media description method and the media encoding method is selected as the system attribute information, this system attribute information is selected based on the data attribute information like in the case of the communication rate.

Figure 8:
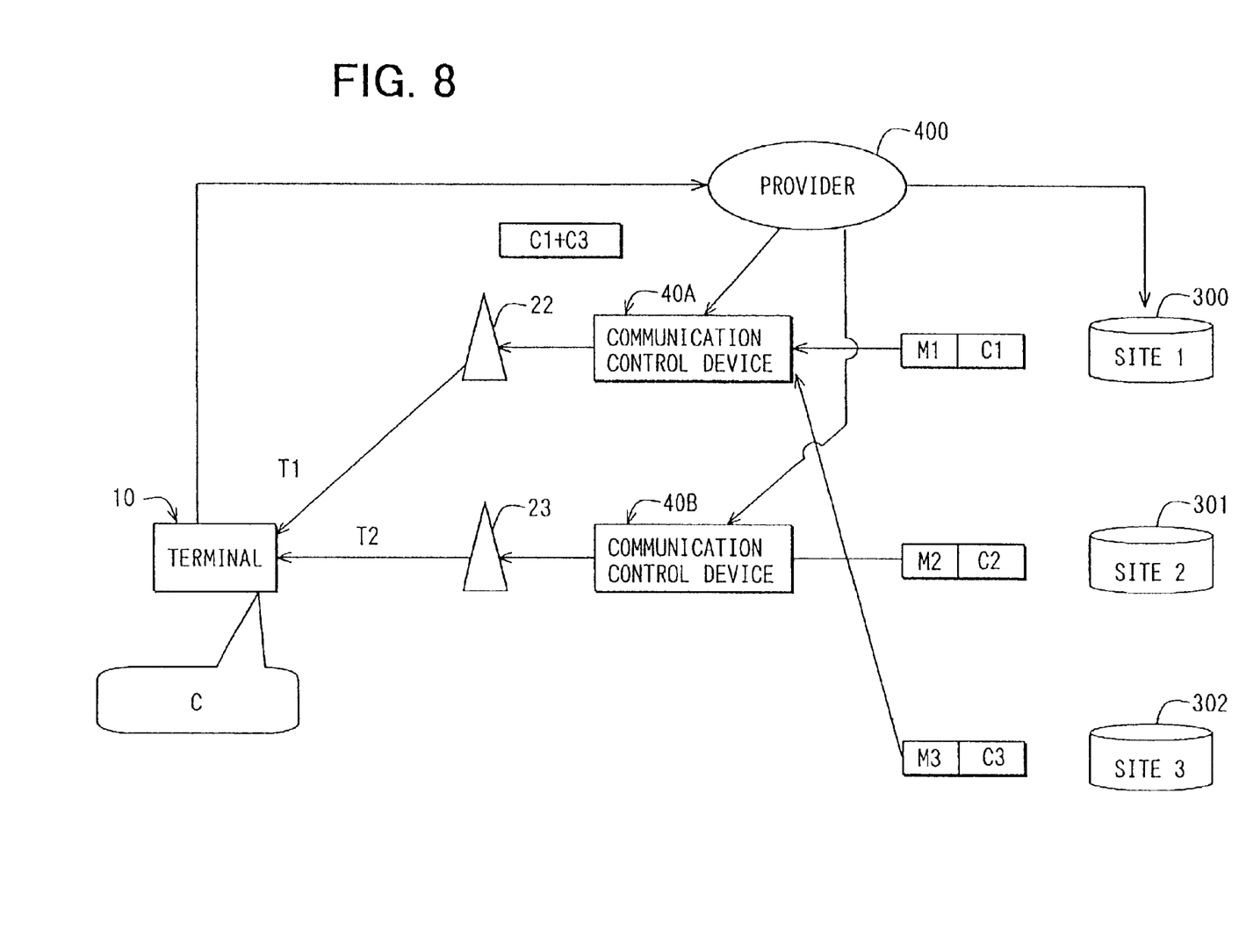
FIG. 8 is a schematic diagram showing a modification of the embodiment.

The adaptive communication system is not limited to the above modification and can be modified to the one shown in FIG. 8. This is different form the modification shown in FIG. 7. That is, the profile M3 and the contents data segment C3 from the site 302 are transmitted to the communication control device 40A. Then, in the communication control device 40A, the contents data segments C1, C3 are integrated and are transmitted to the communication terminal 10 through the base station 22.

Figure 9:
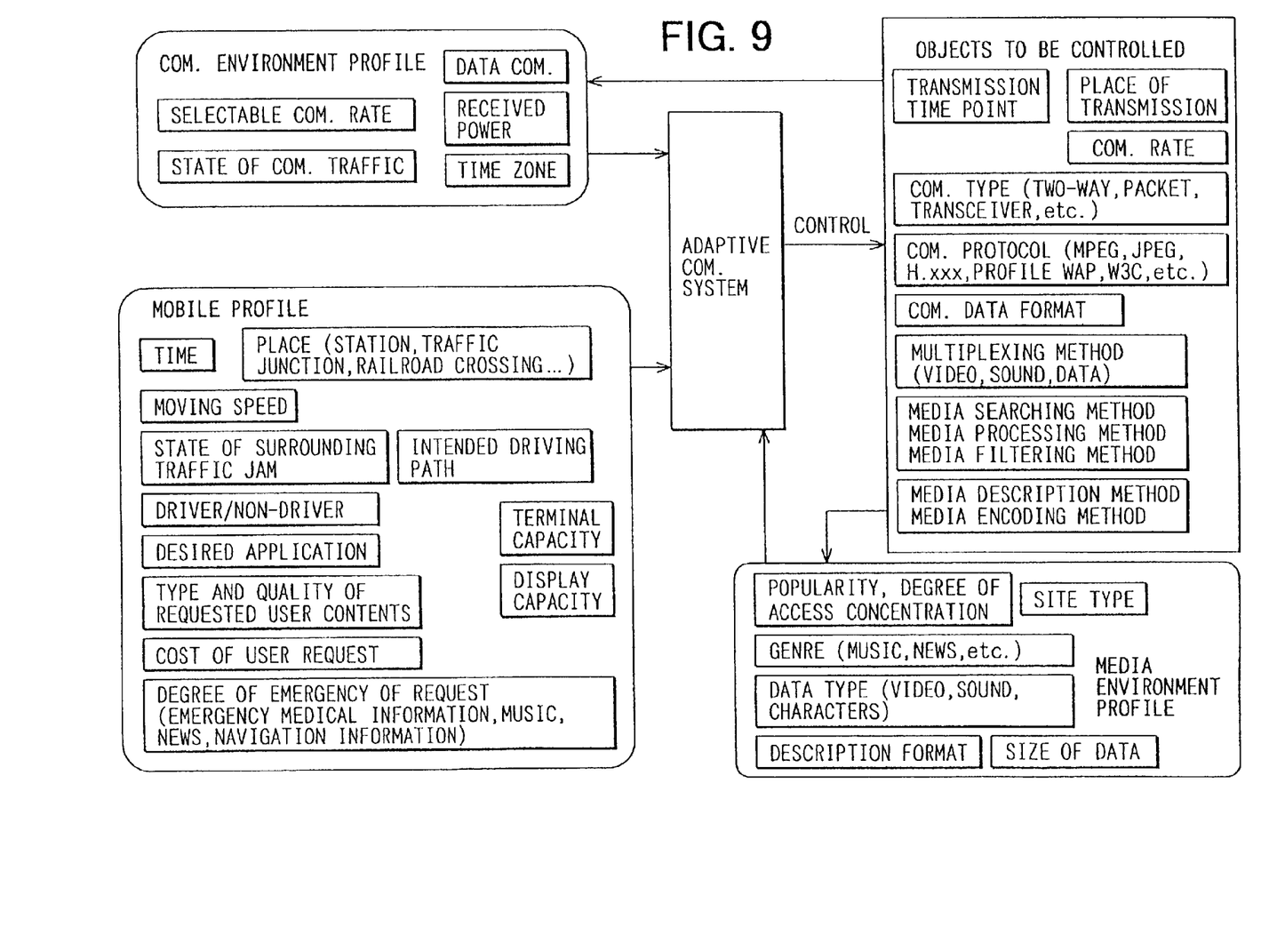
FIG. 9 is a schematic diagram showing a modification of the embodiment.

Furthermore, in the above embodiment, the evaluation function that uses the moving speed and the transmission rate is used as the data attribute information, and the system attribute information is selected based on the result of the evaluation function. However, this can be modified as follows. That is, in the process of selecting the communication system (or specifying the download time), in addition to the moving speed and the transmission rate, it is possible to further consider at least one of the selectable communication rate, the received power, a state of communication traffic (or a degree of communication traffic congestion), place (a station, a traffic junction, a railroad crossing), a state of surrounding traffic jam, intended driving path, a carrier (driver/non-driver) of the communication terminal, a desired application, a type and quality of the contents, a cost of user request, a degree of emergency of the request (emergency medical information, music, news, navigation information), communication terminal capacity, display capacity and the like, as shown in FIG. 9.

Furthermore, in the process of selecting the system attribute information (or in a process of specifying download time), popularity of the contents (e.g., degree of access concentration), a site type, a genre (e.g., music, news), data type (e.g., video, sound, characters), the description method and/or a size of the data can be further considered in addition to the moving speed and the transmission rate.

Furthermore, the following modification is also possible. That is, in addition to the selection of the system attribute information, selection of the site, specification of access time of the contents, specification of the communication protocol, specification of the description method, specification of a process tool, specification of the encoding method and/or the like is possible. Furthermore, the above selection can be conducted based on a place or a predicted place of the communication terminal 10 and its operation time. Also, it is possible to select the communication system based on an acceleration of the communication terminal 10. Moreover, the communication system can be selected based on an intended moving path of the user or of the communication terminal 10 (e.g., a train, a bus, an automobile, an airplane, a ship, an escalator in a building, a moving walkway) and also based on a point where the large-volume communication is possible (e.g., an intersection, a train station, a convenience store, a gas station, a toll gate) In addition, the communication system may be selected also based on a type of the user (e.g., a driver, a non-driver vehicle occupant, a pedestrian, a passenger of a commercial vehicle).

Furthermore, in addition to the selection of the system attribute information, a task priority order of a display process, a communication process and a contents handling process in the communication terminal 10 of the above embodiment can be changed. Also, the searching method, the filtering method, search depth of metadata (contents description data), structure of the metadata (hierarchical relationship of the attributes, a format of the data attribute information, or the like) or the division method of the contents may be modified.

In addition to the selection of the communication system described in the above embodiment, each one of the means for integrating the contents data segments distributed among the sites, and the means for transmitting the contents after dividing the contents into the smaller segments may be modified. Also, the contents that are distributed among the plurality of sites can be transmitted based on the type of the contents (media environment), the communication environment and the user request by switching the site from one to another.

In one practice of the present invention, if a first communication terminal has both the profile and the data, the first communication terminal may transmit the data to the server based on the profile (data attribute information), and the server, in turn, may transmit the data to a second communication terminal based on the profile (data attribute information). Furthermore, the data may be transmitted between the first communication terminal and the second communication terminal based on the profile (data attribute information) without using the server.

In the practice of the present invention, the present invention is not limited to the download from the database computer 50 to the communication terminal 10 and can be applied to upload from the communication terminal 10 to the database computer 50. That is, when the communication terminal 10 uploads the data to database computer 50 through the communication control device 40, the communication terminal 10 may select one of the communication systems A, B based on the profile (data attribute information) which indicates the communication type corresponding to the contents of the newspaper data, and the communication terminal 10 may transmit the data to the database computer 50 through the communication control device 40 and also through the selected communication system.

In the above embodiment, the communication system is selected based on the profile data (data attribute information). However, the download time of the data corresponding to the contents of the data maybe used as the data attribute information. That is, the communication terminal 10 transmits the communication request signal, which requests the download of the data, to the database computer 50 through the communication control device 40. After reception of the communication request signal, the database computer 50, in turn, transmits the data attribute information, which indicates the download time of the data, to the communication terminal 10 through the communication control device 40. Then, after reception of the data attribute information, the communication terminal 10 transmits the transmission request signal, which requests the download of the data, to the database computer 50 through the communication control device 40 at the download time. After reception of the transmission request signal, the database computer 50 transmits the data to the communication terminal 10 through the communication control device 40. Then, the communication terminal 10 receives the data.

In this instance, the communication control device 40 includes the data storage, the attribute adder, the first receiver, the data attribute information transmitter, the second receiver and the data transmitter. The data storage stores the data. The attribute adder adds the data attribute information that indicates download time of the data corresponding to the contents of the data. The first receiver receives the communication request signal (first request signal) for requesting the download of the data. The data attribute information transmitter transmits the data attribute information in response to reception of the communication request signal. The second receiver receives the transmission request signal (second request signal) for requesting the download of the data. The data transmitter transmits the data in response to reception of the transmission request signal (second request signal).

Furthermore, in the communication terminal 10, the communication request signal (first request signal), which requests the download of the data, is transmitted to the database computer 50 through the communication control device 40 upon operation of the control unit 13. Then, after transmission of the communication request signal, the communication terminal 10 receives the data attribute information, which indicates the download time of the data corresponding to the contents of the data, from the communication control device 40. Upon reception of the data attribute information, the communication terminal 10 transmits the transmission request signal (second request signal) to the communication control device 40 at the download time. Then, after transmission of the transmission request signal, the communication terminal 10 receives the data from the communication control device 50.

Also, in the practice of the present invention, the profile may be formed by the database computer 50 based on the data. Alternatively, the profile may be formed by the communication control device 40 based on the data.

Also, in the practice of the present invention, the computer programs stored in the memory 12 of the communication terminal 10 may be delivered from a recording media of the server through the communication via the network. Furthermore, it is possible to provide a plurality of memories 12, and the computer programs may be distributed among the memories 12. Furthermore, in the practice of the present invention, the profile may be stored separately from the data in the database computer 50. Also, in the practice of the present invention, the communication terminal 10 is not necessarily the cellular phone and can be any device, such as a portable communication terminal, a computer or the like.

Additional advantages and modifications will readily occur to those skilled in the art. The invention in its broader terms is therefore, not limited to the specific details, representative apparatus, and illustrative examples shown and described.

What is claimed is:

1. An adaptive communication system comprising a first communication device and a second communication device, said first communication device being adapted for use with a plurality of communication systems, said first communication device transmitting a first request signal for requesting download of data to said second communication device, said second communication device transmitting data attribute information indicative of contents of said data to said first communication device after reception of said first request signal, said second communication device storing said data and said data attribute information in association with one another, said first communication device selecting one of said plurality of communication systems based on said data attribute information after reception of said data attribute information, said first communication device transmitting a second request signal for requesting said download through said selected communication system to said second communication device, said second communication device transmitting said data to said first communication device through said selected communication system after reception of said second request signal, said first communication device receiving said data.

2. An adaptive communication system according to claim 1, wherein said first communication device selects said one of said plurality of communication systems also based on system attribute information of each one of said plurality of communication systems besides said data attribute information.

3. An adaptive communication system according to claim 2, wherein said system attribute information includes information indicative of a communication type used in said each one of said plurality of communication systems.

4. An adaptive communication system according to claim 2, wherein said system attribute information includes information indicative of a communication protocol used in said each one of said plurality of communication systems.

5. An adaptive communication system according to claim 2, wherein said system attribute information includes information indicative of an encryption means used in said each one of said plurality of communication systems.

6. An adaptive communication system according to claim 2, wherein said system attribute information includes information indicative of a multiplexing method used in said each one of said plurality of communication systems.

7. An adaptive communication system according to claim 2, wherein said system attribute information includes information indicative of a communication rate used in said each one of said plurality of communication systems.

8. An adaptive communication system according to claim 2, wherein said system attribute information includes information indicative of a media searching method used in said each one of said plurality of communication systems.

9. An adaptive communication system according to claim 2, wherein said system attribute information includes information indicative of a place of transmission within said each one of said plurality of communication systems.

10. An adaptive communication system according to claim 2, wherein said system attribute information includes information indicative of a communication data format used in said each one of said plurality of communication systems.

11. An adaptive communication system according to claim 2, wherein said system attribute information includes information indicative of a media filtering method used in said each one of said plurality of communication systems.

12. An adaptive communication system according to claim 2, wherein said system attribute information includes information indicative of a media processing method used in said each one of said plurality of communication systems.

13. An adaptive communication system according to claim 2, wherein said system attribute information includes information indicative of a media description method used in said each one of said plurality of communication systems.

14. An adaptive communication system according to claim 2, wherein said system attribute information includes information indicative of a media encoding method used in said each one of said plurality of communication systems.

15. An adaptive communication system according to claim 2, wherein said system attribute information includes information indicative of transmission time specified in said each one of said plurality of communication systems.

16. An adaptive communication system according to claim 1, wherein said data attribute information is indicative of a degree of emergency for downloading the data.

17. A communication control device comprising:
a data storage that stores data;
an attribute adder that adds data attribute information indicative of contents of said data;
a first receiver that receives a first request signal for requesting download of said data;
a data attribute information transmitter that transmits said data attribute information in response to reception of said first request signal;
a second receiver that receives a second request signal for requesting said download, said second request signal being made based on said data attribute information; and
a data transmitter that transmits said data in response to reception of said second request signal.

18. A communication control device according to claim 17, wherein said data attribute information is indicative of a degree of emergency for downloading the data.

19. A communication terminal adapted for use with a plurality of communication systems, said communication terminal comprising:

a control unit;

a first transmitting means that transmits a first request signal to a second communication device in response to operation of said control unit, said first request signal requesting download of data;

a first receiving means that receives data attribute information indicative of contents of said data from said second communication device after transmission of said first request signal, said data and said data attribute information being stored in association with one another in said second communication device;

a selecting means that selects one of said plurality of communication systems based on said data attribute information after reception of said data attribute information;

a second transmitting means that transmits a second request signal to said second communication device, said second request signal requesting said download through said selected communication system; and a second receiving means that receives said data from said second communication device through said selected communication system after transmission of said second request signal.

20. A communication terminal according to claim 19, wherein said data attribute information is indicative of a degree of emergency for downloading the data.

21. A computer program for operating a computer of a communication terminal, said computer program executing steps of:

transmitting a first request signal to a second communication device in response to operation of a control unit of said communication terminal, said first request signal requesting download of data;

receiving data attribute information indicative of contents of said data from said second communication device after transmission of said first request signal, said data and said attribute information being stored in association with one another in said second communication device;

selecting one of said plurality of communication systems based on said data attribute information after reception of said data attribute information;

transmitting a second request signal to said second communication device, said second request signal requesting said download through said selected communication system; and receiving said data from said second communication device through said selected communication system after transmission of said second request signal.

22. A computer program according to claim 21, wherein said data attribute information is indicative of a degree of emergency for downloading the data.

23. A communication method comprising steps of:

transmitting a first request signal from a first communication device to a second communication device, said first request signal requesting download of data;

transmitting data attribute information from said second communication device to said first communication device after reception of said first request signal, said data attribute information being indicative of download time determined based on contents of said data;

transmitting a second request signal from said first communication device to said second communication device at said download time after reception of said data attribute information, said second request signal requesting said download;

transmitting said data from said second communication device to said first communication device after reception of said second request signal; and receiving said data in said first communication device.

24. A communication method according to claim 23, wherein said data attribute information is indicative of a degree of emergency for downloading the data.

25. A communication control device comprising:

a data storage that stores data;

an attribute adder that adds data attribute information indicative of download time determined based on contents of said data;

a first receiver that receives a first request signal for requesting download of said data;

a data attribute information transmitter that transmits said data attribute information in response to reception of said first request signal;

a second receiver that receives a second request signal for requesting said download; and a data transmitter that transmits said data in response to reception of said second request signal.

26. A communication control device according to claim 25, wherein said data attribute information is indicative of a degree of emergency for downloading the data.

27. A communication terminal comprising:

a control unit;

a first transmitting means that transmits a first request signal to a second communication device in response to operation of said control unit, said first request signal requesting download of data;

a first receiving means that receives data attribute information from said second communication device after transmission of said first request signal, said data attribute information being indicative of download time determined based on contents of said data;

a second transmitting means that transmits a second request signal to said second communication device at said download time after reception of said data attribute information, said second request signal requesting said download; and a second receiving means that receives said data from said second communication device after transmission of said second request signal.

28. A communication terminal according to claim 27, wherein said data attribute information is indicative of a degree of emergency for downloading the data.

29. A computer program for operating a computer of a communication terminal, said computer program executing steps of:

transmitting a first request signal to a second communication device in response to operation of a control unit of said communication terminal, said first request signal requesting download of data;

receiving data attribute information from said second communication device after transmission of said first request signal, said data attribute information being indicative of download time determined based on contents of said data;

transmitting a second request signal to said second communication device at said download time after reception of said data attribute information, said second request signal requesting said download; and receiving said data from said second communication device after transmission of said second request signal.

30. A computer program according to claim 29, wherein said data attribute information is indicative of a degree of emergency for downloading the data.

* * * * *

UNITED STATES PATENT AND TRADEMARK OFFICE
CERTIFICATE OF CORRECTION

PATENT NO. : 6,912,385 B2
DATED : June 28, 2005
INVENTOR(S) : Hideaki Namba et al.

It is certified that error appears in the above-identified patent and that said Letters Patent is hereby corrected as shown below:

<u>Title page,</u>
Item [30], Foreign Application Priority Data, "Sep. 12, 2000" should be -- Sep. 13, 2000 --.

Signed and Sealed this

Twenty-ninth Day of November, 2005

JON W. DUDAS
*Director of the United States Patent and Trademark Office*